United States Patent
Kimoto et al.

(10) Patent No.: US 6,777,109 B2
(45) Date of Patent: Aug. 17, 2004

(54) CERAMIC CAPACITOR

(75) Inventors: Mitsuaki Kimoto, Miyazaki (JP);
Masanori Fujimura, Miyazaki-gun (JP); Tokuji Nishino, Koyu-gun (JP); Mitsuhiro Yamamoto, Miyazaki-gun (JP)

(73) Assignee: Matsushita Electric Industrial Co., Ltd. (JP)

( * ) Notice: Subject to any disclaimer, the term of this patent is extended or adjusted under 35 U.S.C. 154(b) by 36 days.

(21) Appl. No.: 10/244,106

(22) Filed: Sep. 16, 2002

(65) Prior Publication Data

US 2003/0137797 A1 Jul. 24, 2003

(30) Foreign Application Priority Data

| Sep. 14, 2001 | (JP) | ......................... | 2001-279955 |
| Nov. 26, 2001 | (JP) | ......................... | 2001-358799 |
| Nov. 28, 2001 | (JP) | ......................... | 2001-362220 |

(51) Int. Cl.[7] ............ H01G 4/12; B32B 15/04
(52) U.S. Cl. ........ 428/633; 428/469; 428/472; 428/697; 428/702; 361/306.1; 361/311; 361/321.1; 361/321.4; 361/321.5
(58) Field of Search ............ 428/632, 633, 428/469, 472, 689, 697, 702; 361/311, 306.1, 307, 321.1, 321.4, 321.5

(56) References Cited

U.S. PATENT DOCUMENTS

| 4,168,519 A | * | 9/1979 | Hertz | ............ 361/304 |
| 4,241,378 A | * | 12/1980 | Dorrian | ............ 361/305 |
| 4,607,316 A | * | 8/1986 | Wada et al. | ............ 361/321.4 |
| 4,799,127 A | * | 1/1989 | Ono et al. | ............ 361/321.5 |
| 5,075,818 A | * | 12/1991 | Ueno et al. | ............ 361/321.4 |
| 5,208,727 A | * | 5/1993 | Okamoto et al. | ............ 361/321.4 |
| 5,268,006 A | * | 12/1993 | Ueno et al. | ............ 29/25.03 |
| 6,043,973 A |  | 3/2000 | Nagashima et al. | ............ 361/305 |

FOREIGN PATENT DOCUMENTS

| EP | 412167 B1 | * | 12/1995 | ............ C04B/35/46 |
| JP | 63-236785 |  | 10/1988 | |
| JP | 02-123720 |  | 5/1990 | |
| JP | 08130157 A | * | 5/1996 | ............ H01G/4/12 |
| JP | 08138972 A | * | 5/1996 | ............ H01G/4/12 |

* cited by examiner

*Primary Examiner*—Stephen Stein
(74) *Attorney, Agent, or Firm*—Parkhurst & Wendel, L.L.P.

(57) ABSTRACT

A ceramic capacitor for operating at a suppressed self heat-generation and a low loss even in high voltage operating conditions, including a dielectric ceramic element assembly having two surfaces and made of a material selected from the group consisting of a dielectric composition of $CaTiO_3$—$La_2O_3$—$TiO_2$ system, a dielectric composition of $CaTiO_3$—$La_2O_3$—$TiO_2$—$SrTiO_3$ system, a dielectric composition of $SrTiO_3$—$CaTiO_3$ system, a dielectric composition of $SrTiO_3$—$CaTiO_3$—$Bi_2O_3$—$TiO_2$ system, a dielectric composition of $SrTiO_3$—$PbTiO_3$—$PbTiO_3$ system, and a dielectric composition of $SrTiO_3$—$PbTiO_3$—$Bi_{2/3}TiO_3$—$CaTiO_3$ system; and an electrode made mainly of Zn located on each of the two surfaces of the dielectric ceramic element.

29 Claims, 11 Drawing Sheets

200

CERAMIC CAPACITOR

TECHNICAL FIELD

The present invention relates to ceramic capacitors used in various kinds of apparatus, such as a ballast circuit of an LCD backlight inverter, a primary/secondary snubber circuit in a switching power supply, a horizontal resonance circuit of a TV receiver/CRT display, an inverter fluorescent lamp, a high voltage/pulse circuit of an electronic appliance, a surge protection circuit in a communication modem; more specifically, the ceramic capacitors that provide a suppressed self heat-generation property and a low loss even in the high frequency/high voltage operating conditions.

BACKGROUND OF THE INVENTION

Large screen-size/high picture-quality CRT displays and LCD displays have acquired an increasing popularity. At the same time, down-sizing of the switching power supply circuit is a recent trend in the industry. The ceramic capacitors, among the key passive components used in these devices, are required to be able to operate under the operating conditions of higher frequency and higher voltage.

In addition to the more stringent operating conditions, the ceramic capacitors are particularly requested to be more compact and lighter in weight to meet the downsizing trends in the switching power supply circuits and the DC-DC converter circuits.

The ceramic capacitors are facing another task. A ceramic capacitor has been structured of a disc-shape dielectric ceramic element assembly and an electrode provided on both surfaces in the main area of the disc-shape dielectric ceramic element assembly, each of the electrodes being connected with a lead wire, and the whole structure being covered by an appropriate molding material. As to the electrode material for ceramic capacitors, silver (Ag) has long been used. The Ag electrode, however, exhibits a substantial self heat-generation and an electro-migration as well.

In place of the Ag electrodes, electrodes made of a cheaper base metal, such as copper (Cu), nickel (Ni), are used among the recent ceramic capacitors. The electrodes made of Cu or other base metals are provided by baking in a neutral or reductive atmosphere in consideration for anti-oxidation. In order to prevent the dielectric ceramic element assembly from being reduced in the reductive atmosphere, there have been proposals of improving the method of baking, adding a certain specific addition agent to a composition of the dielectric ceramic element assembly. Among the proposals, the Japanese Laid-open Patent No. H6-70944 teaches the following ceramic capacitor:

A ceramic capacitor of low loss rate; comprising
  a ceramic dielectric element assembly made of 100 part of
    $SrTiO_3$ for 30.0–70.0 weight %,
    $PbTiO_3$ for 0.0–40.0 weight %,
    $Bi_2O_3$ for 8.0–40.0 weight %,
    $TiO_2$ for 3.0–20.0 weight %, and
    MgO for 1.0–10.0 weight %, plus an addition of CuO for 0.05–0.7 weight %, CoO for 0.05–3.00 weight % and $CeO_2$ for 0.05–3.00 weight %; and
  an electrode made mainly of Cu baked on the opposing surfaces of the ceramic dielectric element assembly.

A Cu electrode or the like base metal electrode for ceramic capacitors, however, need to be baked in a neutral or a reductive atmosphere in view of anti-oxidation. This means that conditions for the neutral or the reductive atmosphere needs to be controlled strictly, which would lead to a deteriorated productivity. Furthermore, should an oxidized base metal electrode actually occur, it not only affects the production yield rate but it significantly impairs the productivity over the total manufacturing process, since it is difficult to detect and select this kind of defects through of a non-destructive inspection process. The adding of a certain specific substance to composition of the dielectric ceramic element represents that the composition ratio needs to be placed under a stringent control, which is another factor of an increased cost.

In order to improve the above-described drawbacks, the Japanese Laid-open Patent No. S63-236785, for example, discloses a process in which a zinc (Zn) paste is applied for baking in the atmospheric air. The U.S. Pat. No. 6,043,973 teaches a ceramic capacitor in which a three-layered electrode is provided by a dry plating method, the first layer of which being Zn. These conventional ceramic capacitors, however, are not provided with any improvement measure that is inexpensive yet effective for suppressing a self heat-generation.

SUMMARY OF THE INVENTION

A ceramic capacitor of the present invention comprises a dielectric ceramic element made of any one of the followings as the main constituent:
(A) $CaTiO_3$—$La_2O_3$—$TiO_2$,
(B) $CaTiO_3$—$La_2O_3$—$TiO_2$—$SrTiO_3$,
(C) $SrTiO_3$—$CaTiO_3$,
(D) $SrTiO_3$—$CaTiO_3$—$Bi_2O_3$—$TiO_2$,
(E) $SrTiO_3$—$PbTiO_3$—$Bi_{2/3}TiO_3$ and
(F) $SrTiO_3$—$PbTiO_3$—$Bi_{2/3}TiO_3$—$CaTiO_3$; and
an electrode made mainly of Zn provided on both of the opposing surfaces of the dielectric ceramic element assembly.

BEST MODE FOR CARRYING OUT THE INVENTION

Figure 1A:
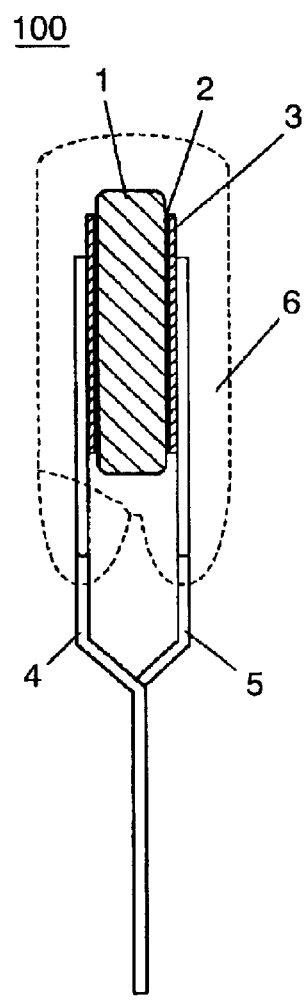
FIG. 1A is a perspective side view of a ceramic capacitor in accordance with a first exemplary embodiment of the present invention.

In the first place, description is made on a dielectric ceramic element assembly constituting, which is the main component of a ceramic capacitor in accordance with the present invention.

A dielectric ceramic element assembly is made of any one of the following dielectric compositions (A) through (F);

(A) A Dielectric Composition of $CaTiO_3$—$La_2O_3$—$TiO_2$ System.

The dielectric ceramic element assembly is made by powder of the $CaTiO_3$—$La_2O_3$—$TiO_2$ for the main constituent, added with any one or more selected from the group consisting of $MnO_2$, $Al_2O_3$, $SiO_2$, $ZnO$, $MgO$ and $Mg_2TiO_4$ for the addition agent-cum-sintering auxiliary, and sintered.

Preferred composition (mole ratio) is:

| | |
|---|---|
| $CaTiO_3$ | 0.05–0.95 |
| $La_2O_3$—$TiO_2$ | 0.05–0.80 |

Among the above $La_2O_3$—$TiO_2$, it is further preferred that $La_2O_3$ is ⅓ mole to 1 mole of $TiO_2$.

As to the addition agent-cum-sintering auxiliary, quantity of one or more selected from the group consisting of $MnO_2$, $Al_2O_3$, $SiO_2$, $ZnO$, $MgO$ and $Mg_2TiO_4$ may be varied within a range 0.01–1.0 weight % to the main constituent $CaTiO_3$—$La_2O_3$—$TiO_2$.

(B) A Dielectric Composition of $CaTiO_3$—$La_2O_3$—$TiO_2$—$SrTiO_3$ System.

The dielectric ceramic element assembly is made by powder of the $CaTiO_3$—$La_2O_3$—$TiO_2$—$SrTiO_3$ for the main constituent, added with the addition agent-cum-sintering auxiliary in the same manner as in (A), and sintered.

Preferred composition (mole ratio) is:

| | |
|---|---|
| $CaTiO_3$ | 0.05–0.95 |
| $La_2O_3$—$TiO_2$ | 0.05–0.80 |
| $SrTiO_3$ | 0.05–0.20 |

Among the above $La_2O_3$—$TiO_2$, it is further preferred that the same relationship as in (A) above is maintained.

As to the addition agent-cum-sintering auxiliary, quantity of one or more selected from the group consisting of $MnO_2$, $Al_2O_3$, $SiO_2$, $ZnO$, $MgO$ and $Mg_2TiO_4$ may be varied within a range 0.01–1.0 weight % to the main constituent $CaTiO_3$—$La_2O_3$—$TiO_2$—$SrTiO_3$.

(C) A Dielectric Composition of $SrTiO_3$-$CaTiO_3$ System.

The dielectric ceramic element assembly is made by powder of the $SrTiO_3$—$CaTiO_3$ for the main constituent, added with any one or more selected from the group consisting of $MnO_2$, $Al_2O_3$, $SiO_2$, $ZnO$, $MgO$ and $Mg_2TiO_4$ for the addition agent-cum-sintering auxiliary, and sintered.

Preferred composition (mole ratio) is:

| | |
|---|---|
| $SrTiO_3$ | 0.55–0.75 |
| $CaTiO_3$ | 0.25–0.45 |

As to the addition agent-cum-sintering auxiliary, quantity of one or more selected from the group consisting of $MnO_2$, $Al_2O_3$, $SiO_2$, $ZnO$, $MgO$ and $Mg_2TiO_4$ may be varied within a range 0.01–3.0 weight % to the main constituent $SrTiO_3$—$CaTiO_3$.

(D) A Dielectric Composition of $SrTiO_3$—$CaTiO_3$—$Bi_2O_3$—$TiO_2$ system.

The dielectric ceramic element assembly is made by powder of the $SrTiO_3$—$CaTiO_3$—$Bi_2O_3$—$TiO_2$ for the main constituent, added with the addition agent-cum-sintering auxiliary in the same manner as in (C) above, and sintered.

Preferred composition (mole ratio) is:

| | |
|---|---|
| $SrTiO_3$ | 0.55–0.75 |
| $CaTiO_3$ | 0.25–0.45 |
| $Bi_2O_3$—$TiO_2$ | 0.00–0.25 |

Among the above $Bi_2O_3$—$TiO_2$, it is further preferred that $Bi_2O_3$ is ⅓ mole to 1 mole of $TiO_2$.

As to the addition agent-cum-sintering auxiliary, quantity of one or more selected from the group consisting of $MnO_2$, $Al_2O_3$, $SiO_2$, $ZnO$, $MgO$ and $Mg_2O_4$ may be varied within a range 0.01–3.0 weight % to the main constituent $SrTiO_3$—$CaTiO_3$—$Bi_2O_3$—$TiO_2$ At least a part of Bi in the $Bi_2O_3$—$TiO_2$ can be replaced with rare earths. Any one or more selected from La, Ce and Nd is preferred for the rare earths. The replacement with rare earths reduces the voltage dependence of a capacitor and improves the voltage withstanding capability. In practice, $La_2O_3$, $2CeO_2$, $Nd_2O_3$, may be added respectively. As to the quantity, it should be added so that the Bi mole ratio in $Bi_2O_3$—$TiO_2$, the sum of Bi and La mole ratios, the sum of Bi and Nd mole ratios and the sum of Bi and Ce mole ratios are equal in each case. When at least a part of the Bi is replaced with two or three selected from La, Ce and Nd, it should be added so that the Bi mole ratio in $Bi_2O_3$—$TiO_2$ is equal to the sum of those of Bi and two or three of La, Nd and Ce.

(E) A Dielectric Composition of $SrTiO_3$—$PbTiO_3$—$Bi_{2/3}TiO_3$ System.

The dielectric ceramic element assembly is made by powder of the $SrTiO_3$—$PbTiO_3$—$Bi_{2/3}TiO_3$ for the main constituent, added with any one or more selected from the group consisting of $Nd_2O_3$, $CeO_2$, $Nb_2O_5$, $MgO$, $SnO_2$, $Cu_2O$, $ZrO_2$, $MnO_2$ and $SiO_2$ for the addition agent-cum-sintering auxiliary, and sintered.

Preferred composition (mole ratio) is:

| | |
|---|---|
| $SrTiO_3$ | 0.40–0.60 |
| $PbTiO_3$ | 0.08–0.20 |
| $Bi_{2/3}TiO_3$ | 0.15–0.35 |

As to the addition agent-cum-sintering auxiliary, quantity of one or more selected from the group consisting of $Nd_2O_3$, $CeO_2$, $Nb_2O_5$, MgO, $SnO_2$, $Cu_2O$, $ZrO_2$, $MnO_2$ and $SiO_2$ may be varied within a range 0.1–5.0 weight % to the main constituent $SrTiO_3$—$PbTiO_3$—$Bi_{2/3}TiO_3$.

(F) A Dielectric Composition of $SrTiO_3$—$PbTiO_3$—$Bi_{2/3}TiO_3$—$CaTiO_3$ System.

The dielectric ceramic element assembly is made by powder of the $SrTiO_3$—$PbTiO_3$—$Bi_{2/3}TiO_3$—$CaTiO_3$ added with the addition agent-cum-sintering auxiliary in the same manner as in (E) above, and sintered.

Preferred composition (mole ratio) is:

| | |
|---|---|
| $SrTiO_3$ | 0.30–0.60 |
| $PbTiO_3$ | 0.08–0.40 |
| $Bi_{2/3}TiO_3$ | 0.10–0.38 |
| $CaTiO_3$ | 0.01–0.25 |

As to the addition agent-cum-sintering auxiliary, quantity of one or more selected from the group consisting of $Nd_2O_3$, $CeO_2$, $Nb_2O_5$, MgO, $SnO_2$, $Cu_2O$ $ZrO_2$, $MnO_2$ and $SiO_2$ may be varied within a range 0.1–5.0 weight % to the main constituent $SrTiO_3$—$PbTiO_3$—$Bi_{2/3}TiO_3$—$CaTiO_3$ Thus the dielectric ceramic element assembly is manufactured by using any one of the above-described six compositions (A) through (F) for the main constituent, added with an addition agent-cum-sintering auxiliary, and replacing part of the compositions. The ratio is subject to respective compositions.

Next, a first layer of electrode provided on both of the opposing surfaces of the dielectric ceramic element assembly is described.

The first layer of electrode is made of a material containing zinc (Zn) as the main content. This means that the material may have impurities and it can be an alloy, and the Zn content varies depending on the composition. The Zn is permitted to contain a small amount of glass component or other impurities, but purity level should preferably be 95% or higher. Furthermore, it can be made of a Zn alloy; then, the Zn content should preferably be 90% or higher.

The Zn used for the first layer of electrode suppresses the self heat-generation in collaboration with the above-described dielectric ceramic element assembly.

A second layer of electrode, which is provided on the surface of the first layer, is made of a material containing any one or more metals selected from the group consisting of Cu, Ni, Ag, palladium (Pd) and aluminum (Al) as the main constituent. Each of these five metals is allowed to contain a small amount of impurities; but the purity level should preferably be 80% or higher. Furthermore, the second layer may be made of an alloy containing any one or more of the five metals, Cu, Ni, Ag, Pd and Al; then, the sum of five metals in the alloy should preferably be 80% or higher.

The at least one metal selected from Cu, Ni, Ag, Pd and Al, used for the second layer of electrode exhibits a superior adhesive property with the Zn contained in the first layer, at the same time it enhances the soldered strength with the lead wire or the lead terminal. The meaning that any one or more selected from the group of five metals is used as the 'main' constituent of the second layer bears the same implication as the Zn being as 'main' constituent in the first layer of electrode.

Now in the following, ceramic capacitors of the present invention will be described more in detail referring to the drawings.

(Embodiment 1)

Figure 1B:
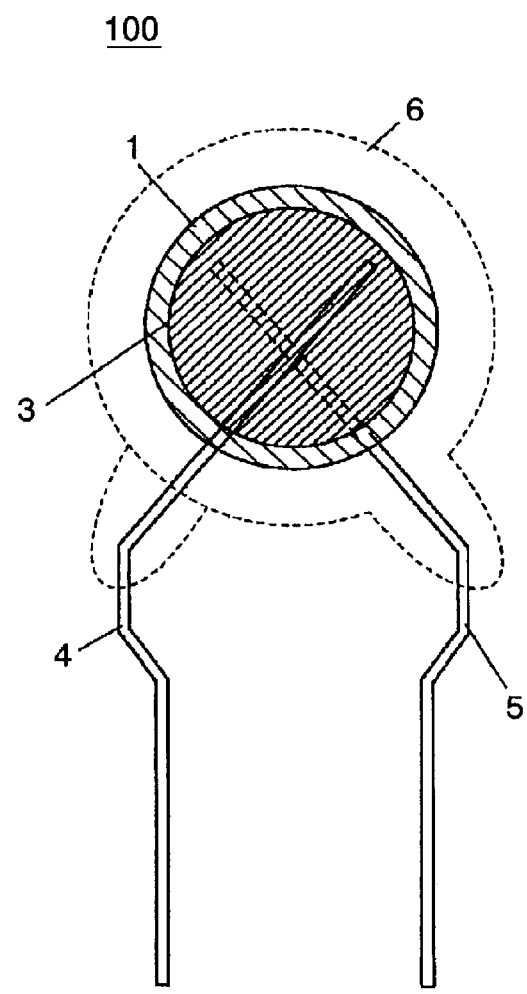
FIG. 1B is a perspective front view of the ceramic capacitor.

FIG. 1A and FIG. 1B respectively show a perspective side view and a perspective front view of a ceramic capacitor in accordance with a first exemplary embodiment of the present invention. A ceramic capacitor 100 comprises a disc shape dielectric ceramic element 1, which is provided with a first electrode layer 2 and a second electrode layer 3, each layer disposed on both surfaces in the main area of the element 1. And a pair of lead wires 4, 5 is provided soldered on the second electrode layers 3.

A molding member 6 is provided to cover part of the lead wires 4, 5 and the entire part of the dielectric ceramic element 1 and the first electrode layer 2 and the second electrode layer 3.

The dielectric ceramic element 1 is formed by a dielectric ceramic element which is made by any one of the above-described dielectric compositions (A)–(F) as the main constituent.

The first electrode layer 2 is made of Zn, while the second electrode layer 3 is made of any one or more metals selected from the group consisting of Cu, Ni, Ag, Pd and Al.

For the lead wires 4 and 5, a soft copper wire for electrical connection specified in JIS (Japanese Industrial Standards) C3102, for example, may be used after being applied with an electrical plating, or a molten solder.

For the molding member 6, a glass, an insulating resin or the like insulating material may be used. An insulating resin is preferred in view of the processing ease and the low cost. Among the insulating resins, a thermosetting resin is easy to process; and a thermosetting epoxy resin, among others, is specifically suitable to the purpose because of its high physical strength and high anti-moisture property. Examples of such epoxy resin include that of ortho-cresol-novorac system, biphenyl system, pentadiene system, etc.

The pair of lead wires 4 and 5 are stretching, as illustrated in FIG. 1A, from the respective surfaces of the dielectric ceramic element 1 in parallel to and with a separating gap between each other, and bent at a certain point to the thickness direction of dielectric ceramic element 1 so that they eventually rest in a single plane, which plane rendering the thickness of dielectric ceramic element 1 to an approximate half.

The lead wires 4 and 5 are connected to the respective second electrode layers 3, in the directions so that the lead wires are crossing to each other on the respective surfaces of dielectric ceramic element 1, as illustrated in FIG. 1B. The lead wires are bent, and then stretching substantially in parallel to each other keeping a certain separating distance. After they are stretched parallel for a certain length, the lead wires 4 and 5 are bent again narrowing the separation distance, and then stretched further in a direction parallel to each other. Thus the lead wires 4, 5 are provided with a portion at which the mutual separating distance is narrowed. The end part of the lead wires 4, 5 are inserted into through holes disposed in a circuit board to be soldered there at the reverse surface. The lead wires 4, 5 bent in the above-described configuration prevent them from sinking further into a circuit board, and a ceramic capacitor 100 is prevented from coming in contact with the surface of the circuit board. Thus, the lead wires 4, 5 are always secured for a certain length between the lowest point of molding member 6 and the upper surface of circuit board. In this setup, a ceramic capacitor 100 is less affected by the soldering heat, and the soldering flux can be surely rejected. Since the aboveconfigured components are less influenced by the soldering heat, it opens the way for the lead-free solders, the melting temperature of which being high.

Next, a method for manufacturing a ceramic capacitor in accordance with a first exemplary embodiment of the present invention is described.

In the first place, any one of the dielectric ceramic materials (A) through (F) is added with a certain specific addition agent-cum-sintering auxiliary, which is wet-mixed or granulated through a generally practiced procedure. It is press-formed to a disc shape, and then sintered.

The dielectric ceramic element 1 thus formed is provided at both of the main surfaces with a first electrode layer 2 made of Zn by means of a printing method. In a normal practice, a Zn paste is screen-printed on both of the main surfaces of the dielectric ceramic element, and baked at approximately 600° C. The baking in the present case does not need to be conducted in the neutral or a reductive atmosphere; the baking is carried out in the normal atmospheric environment. The neutral atmosphere here means that in which neither oxidation nor reduction is caused; it generally means the $N_2$ gas atmosphere. Besides the above-described method, the first electrode layer 2 can be formed also by a dip coating process where a dielectric ceramic element is immersed in a Zn paste, an electro-deposition method, a plating, a vacuum deposition, etc. Considering the costs for manufacturing facilities and relevant processing fees as well as the processing cost of the industrial wastes, the method of applying a paste and baking it is preferred.

The surface of first electrode layer 2 is activated to remove oxides staying thereon. Thereby, the adhesion with the second electrode layer 3 is enhanced, and a possibility of having an unstable metal oxide between the first layer 2 and the second layer 3 is eliminated. The surface activation of first layer 2 is conducted by a chemical etching process using an acidic material. A malic acid of pH 3, for example, is used. An alternative method is a surface roughening by physical etching.

A second layer 3 is provided on the first layer 2 by a plating method. The plating may be either an electrolytic plating or an electroless plating. However, an electroless plating is preferred because it least deteriorates characteristics of the ceramic element.

Lead wire 4, 5 is soldered on the second electrode layer 3, an insulating resin is applied to cover the entire structure, excluding part of the lead wire 4, 5, to form the molding member 6.

Now in the following, a method for manufacturing a ceramic capacitor in accordance with embodiment 1 is detailed, and the characteristics of which ceramic capacitor are compared with those manufactured by a conventional technology.

(Embodiment A1)

To a 100 part (in weight) of the main constituent powder $CaTiO_3$—$La_2O_3$—$TiO_2$ (in mole ratio; $CaTiO_3$ 0.950, $La_2O_3TiO_2$ 0.050), an addition agent-cum-sintering auxiliary is added, MgO for a 0.2 part and $SiO_2$ for a 0.2 part, weighed respectively by means of an electronic balance. These altogether are put into a pot mill containing 5 mm$\phi$ balls of $ZrO_2$ quality, to be mixed for 200 hours at 100 rpm therein. The mixture is thrown in a stainless steel tray bottomed with a Teflon sheet after being filtered through a 150 mesh silk screen, to be dried there at 1200° C. The dried bulk is crushed in an alumina mortar, and then granulated.

The granulated substance is compression-formed into pieces of disc shape, which pieces are sintered at approximately 1350° C. to provide the dielectric ceramic element 1.

The dielectric ceramic element 1 has the dimensions, approximately 10.0 mm in diameter and approximately 1.0 mm in thickness.

The dielectric ceramic element 1 is provided at both of the main surfaces with a first electrode layer 2 of Zn for 8.0 mm in diameter by means of a printing method. It is baked at 640° C.

Surface of the first electrode layer 2 is chemically etched with malic acid of approximately pH 3, for the purpose of removing the surface oxides.

Next, a second electrode layer 3 of Cu is formed on the surface of first electrode layer 2 by means of an electroless plating.

Lead wires are soldered on the second electrode layers 3 formed on the main surfaces of the dielectric ceramic element.

And an epoxy resin is applied to cover the entire structure of dielectric ceramic element provided with the first electrode layer 2 and the second electrode layer 3, with an exception of part of the lead wires 4, 5. Thus the molding member 6 is formed, and a finished ceramic capacitor as shown in FIG. 1A and FIG. 1B is provided.

(Embodiments A2–A10)

Ceramic capacitors in embodiments A5, A7 and A10 are made by powder of the main constituent, $CaTiO_3$—$La_2O_3$—$TiO_2$, with the ratio of composition (mole ratio) varied, in the same manner as in the embodiment A1. Those in embodiments A2–A4, A6, A8 and A9 are made by powder of the main constituent, $CaTiO_3$—$La_2O_3$—$TiO_2$—$SrTiO_3$, with the ratio of composition (mole ratio) varied.

(Comparative Samples A1–A10)

Comparative samples of ceramic capacitors A1–A10 are manufactured by printing an Ag electrode for 8.0 mm in diameter on both main surfaces of the dielectric ceramic element 1, and baking it at 800° C. The rest remains the same as that in the embodiments A1–A10.

The ceramic capacitors in embodiments A1–A10 are measured with respect to electrostatic capacitance (Cap), dielectric loss (Q value=1/tan δ), DC resistance (IR), dielectric shape ($\phi/t$), dielectric constant ($\in$), temperature characteristic (TC), and characteristic of self heat-generation (δt).

Cap and Q value are measured with an LCR meter at signal voltage 1V/1 MHz. IR is measured with an insulation resistance meter applying 500 VDC for 1 min. The $\phi/t$ is measured with a micrometer, while the $\in$ is calculated using the formula shown below. TC is measured in terms of static capacitance at respective temperature levels with an LCR meter.

$$C = \in \cdot \phi^2 / 144t$$

C: static capacitance (Cap)
$\in$: dielectric constant
$\phi$: electrode diameter, dielectric element
t: thickness, dielectric element The δt is measured as follows:
1) A $\phi$ 0.1 mm chromel-alumel thermocouple has been attached tight to the molding member of a ceramic capacitor.
2) AC 5.0 kVp-p, frequency 100 kHz, is applied for letting the ceramic capacitor generate heat.
3) After the temperature rise reached a stability, surface temperature of the molding member is measured. Difference between the surface temperature and the ambient temperature is calculated.

Results of the measurement are shown in Table 1.

Figure 2:
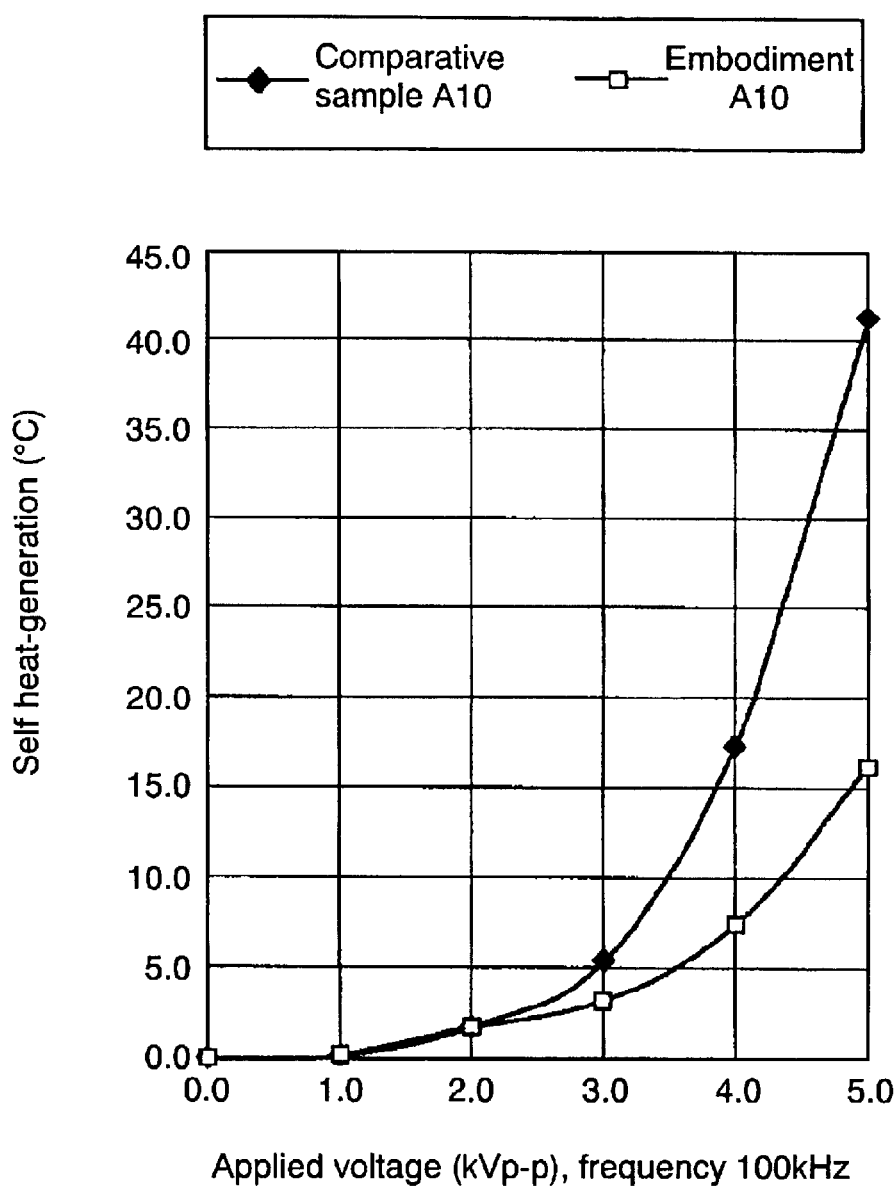
FIG. 2 is a graph showing a relationship between temperature of the self heat-generation and the applied voltage in a ceramic capacitor in embodiment 1.

As to the embodiment A10, the self heat-generation characteristic (δt) was measured in a voltage range, AC 0 kVp-p-5.0 kVp-p, and the relationship with respect to the applied voltage is shown in FIG. 2 in comparison with the comparative sample A10.

As Table 1 and FIG. 2 clearly indicate, a ceramic capacitor comprising a dielectric ceramic element having a certain specific composition in accordance with the present invention, a first electrode layer made of Zn and a second electrode layer made of Cu is superior to that using an Ag electrode, in terms of the self heat-generation characteristic.

powder, $SrTiO_3$—$CaTiO_3$, is varied. Those in embodiments B2, B3, B5 and B7–B9 are made in the same manner as that for the embodiment B1, except that the composition ratio (mole ratio) of the main constituent powder, $SrTiO_3$—$CaTiO_3$—$Bi_2O_3$—$TiO_2$ is varied.

(Comparative Samples B1–B9)

Comparative samples B1–B9 are provided in the same manner as that for the embodiments B1–B9, except that an Ag electrode is printed on both main surfaces of a dielectric

TABLE 1

| | Molar ratio of main constituent | | | Electrical characteristics | | | | | | |
|---|---|---|---|---|---|---|---|---|---|---|
| | $CaTiO_3$ | $La_2O_3$—$TiO2$ | $SrTiO_3$ | Cap (pF) | Q | IR (Ω) 500 Vdc | φ/t (mm/mm) | ε | TC (ppm) −25° C./85° C. | δt(° C.) |
| Em-A1 | 0.950 | 0.050 | 0.000 | 90.66 | 30000 | 3.0E + 13 | 9.50/0.77 | 156 | 1408/1114 | 11.6 |
| Em-A2 | 0.850 | 0.050 | 0.100 | 93.67 | 30000 | 2.5E + 13 | 9.54/0.77 | 162 | 1498/1179 | 18.8 |
| Em-A3 | 0.750 | 0.050 | 0.200 | 88.77 | 30000 | 2.0E + 13 | 9.67/0.79 | 157 | 705/608 | 14.2 |
| Em-A4 | 0.700 | 0.200 | 0.100 | 60.96 | 10000 | 2.5E + 13 | 9.76/0.79 | 108 | 722/640 | 28.9 |
| Em-A5 | 0.600 | 0.400 | 0.000 | 50.15 | 1500 | 3.0E + 13 | 9.52/0.79 | 89 | 370/340 | 16.3 |
| Em-A6 | 0.400 | 0.400 | 0.200 | 43.59 | 2000 | 3.5E + 13 | 9.32/0.76 | 73 | 350/333 | 9.0 |
| Em-A7 | 0.200 | 0.800 | 0.000 | 40.02 | 1300 | 3.0E + 13 | 9.30/0.75 | 67 | 320/312 | 11.1 |
| Em-A8 | 0.200 | 0.600 | 0.200 | 42.20 | 1200 | 3.0E + 13 | 9.48/0.77 | 72 | 368/297 | 13.0 |
| Em-A9 | 0.050 | 0.900 | 0.050 | 42.48 | 1200 | 2.0E + 13 | 9.54/0.75 | 71 | 208/199 | 10.2 |
| Em-A10 | 0.760 | 0.240 | 0.000 | 77.72 | 5200 | 2.0E + 13 | 9.55/0.75 | 131 | 715/618 | 16.3 |
| CS-A1 | 0.950 | 0.050 | 0.000 | 89.90 | 30000 | 3.0E + 13 | 9.52/0.76 | 154 | 1408/1114 | 53.4 |
| CS-A2 | 0.850 | 0.050 | 0.100 | 89.88 | 30000 | 3.0E + 13 | 9.45/0.79 | 160 | 1498/1179 | 47.5 |
| CS-A3 | 0.750 | 0.050 | 0.200 | 89.54 | 30000 | 2.5E + 13 | 9.69/0.78 | 157 | 705/608 | 51.4 |
| CS-A4 | 0.700 | 0.200 | 0.100 | 58.69 | 10000 | 3.0E + 13 | 9.79/0.79 | 108 | 722/640 | 47.4 |
| CS-A5 | 0.600 | 0.400 | 0.000 | 48.03 | 3000 | 3.0E + 13 | 9.52/0.78 | 86 | 370/340 | 37.7 |
| CS-A6 | 0.400 | 0.400 | 0.200 | 43.58 | 4000 | 3.5E + 13 | 9.38/0.77 | 75 | 350/333 | 26.5 |
| CS-A7 | 0.200 | 0.800 | 0.000 | 40.12 | 2300 | 3.0E + 13 | 9.43/0.75 | 68 | 320/312 | 20.1 |
| CS-A8 | 0.200 | 0.600 | 0.200 | 39.69 | 2700 | 3.5E + 13 | 9.52/0.78 | 70 | 368/297 | 18.5 |
| CS-A9 | 0.050 | 0.900 | 0.050 | 42.29 | 6500 | 2.5E + 13 | 9.51/0.75 | 71 | 208/199 | 13.0 |
| CS-A10 | 0.760 | 0.240 | 0.000 | 76.89 | 5500 | 2.0E + 13 | 9.51/0.75 | 131 | 715/618 | 41.6 |

(In the table, Em- and CS- stand for Embodiment and Comparative sample, respectively.)

(Embodiments B1–B9)

A ceramic capacitor in embodiment B1 is provided as follows: To a 100 part (in weight) of the main constituent powder, $SrTiO_3$—$CaTiO_3$ (in mole ratio; $SrTiO_3$ 0.750, $CaTiO_3$ 0.250), an addition agent-cum-sintering auxiliary is added, MgO for a 0.2 part and $SiO_2$ for a 0.2 part, weighed respectively by means of an electronic balance, and these are sintered at approximately 1330° C. For the rest, it remains the same as that in the embodiment A1. A dielectric ceramic element 1 thus provided has the dimensions, approximately 10.0 mm in diameter and approximately 1.0 mm in thickness.

A first electrode layer 2 and a second electrode layer 3 are formed in the same manner as in the embodiment A1, and lead wires are soldered thereon. An epoxy resin is applied to form a molding member.

Those in embodiments B4 and B6 are made in the same manner as that for the embodiment B1, except that the composition ratio (mole ratio) of the main constituent ceramic element 1 for 8.0 mm in diameter and baked at 800° C.

These ceramic capacitors are measured with respect to electrostatic capacitance (Cap), dielectric loss (Q value), DC resistance (IR), dielectric shape (φ/t), dielectric constant (∈), temperature characteristic (TC), and self heat-generation characteristic (δt).

Results of the measurement are shown in Table 2. As to the embodiment B9, the self heat-generation characteristic (δt) was measured in a voltage range, AC 0 kVp-p-5.0 kVp-p, and the relationship with respect to the applied voltage is shown in FIG. 3 in comparison with the comparative sample B9.

Figure 3:
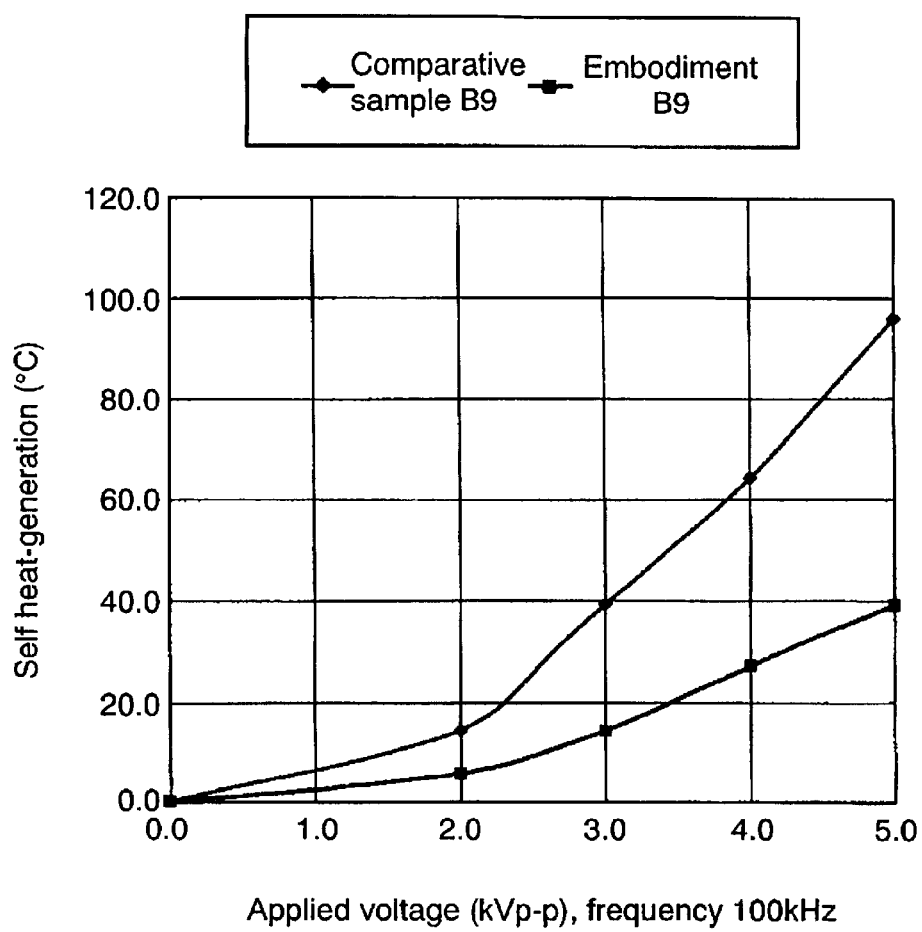
FIG. 3 is a graph showing a relationship between temperature of the self heat-generation and the applied voltage in another example of embodiment 1.

As Table 2 and FIG. 3 clearly indicate, a ceramic capacitor comprising a dielectric ceramic element having a certain specific composition in accordance with the present invention, a first electrode layer made of Zn and a second electrode layer made of Cu is superior to that using an Ag electrode, in terms of the self heat-generation characteristic.

TABLE 2

| | $CaTiO_3$ | $Bi_2O_3$—$TiO2$ | $SrTiO_3$ | Cap (pF) | Q | IR (Ω) 500 Vdc | φ/t (mm/mm) | ε | TC (ppm) −25° C./85° C. | δt(° C.) |
|---|---|---|---|---|---|---|---|---|---|---|
| Em-B1 | 0.250 | 0.000 | 0.750 | 151.20 | 30000 | 2.7E + 12 | 9.89/0.98 | 315 | 3490/2380 | 19.5 |
| Em-B2 | 0.250 | 0.050 | 0.650 | 179.40 | 2880 | 3.1E + 12 | 9.94/1.02 | 390 | 2380/2090 | 23.6 |
| Em-B3 | 0.300 | 0.100 | 0.600 | 213.30 | 350 | 8.0E + 11 | 9.97/0.89 | 408 | 510/1400 | 52.0 |
| Em-B4 | 0.350 | 0.000 | 0.650 | 146.50 | 30000 | 6.5E + 12 | 9.89/0.89 | 278 | 370/1220 | 27.5 |
| Em-B5 | 0.350 | 0.100 | 0.550 | 178.70 | 730 | 4.5E + 11 | 9.96/0.92 | 353 | 980/1240 | 53.0 |
| Em-B6 | 0.450 | 0.000 | 0.550 | 140.80 | 22000 | 5.4E + 12 | 9.90/0.92 | 276 | 2250/3340 | 24.7 |

TABLE 2-continued

|  | CaTiO$_3$ | Bi$_2$O$_3$—TiO2 | SrTiO$_3$ | Cap (pF) | Q | IR (Ω) 500 Vdc | φ/t (mm/mm) | ε | TC (ppm) −25° C./85° C. | δt(° C.) |
|---|---|---|---|---|---|---|---|---|---|---|
| Em-B7 | 0.400 | 0.050 | 0.550 | 144.30 | 2310 | 4.6E + 12 | 9.90/1.02 | 315 | 2450/1220 | 29.5 |
| Em-B8 | 0.225 | 0.025 | 0.750 | 187.60 | 2810 | 2.0E + 12 | 9.94/0.89 | 356 | 4060/2470 | 27.0 |
| Em-B9 | 0.350 | 0.025 | 0.625 | 199.20 | 2300 | 4.5E + 12 | 9.95/0.82 | 348 | 2280/2040 | 39.0 |
| CS-B1 | 0.250 | 0.000 | 0.750 | 151.20 | 30000 | 2.5E + 12 | 9.88/0.98 | 315 | 3480/2390 | 74.5 |
| CS-B2 | 0.250 | 0.050 | 0.650 | 179.80 | 3050 | 3.0E + 12 | 9.95/1.02 | 390 | 2380/2070 | 64.0 |
| CS-B3 | 0.300 | 0.100 | 0.600 | 214.20 | 370 | 9.0E + 11 | 9.99/0.89 | 408 | 500/1430 | 98.0 |
| CS-B4 | 0.350 | 0.000 | 0.650 | 146.00 | 30000 | 6.5E + 12 | 9.90/0.89 | 278 | 360/1210 | 82.0 |
| CS-B5 | 0.350 | 0.100 | 0.550 | 179.70 | 920 | 5.0E + 11 | 9.95/0.92 | 353 | 980/1230 | 75.5 |
| CS-B6 | 0.450 | 0.000 | 0.550 | 141.20 | 30000 | 6.0E + 12 | 9.92/0.92 | 276 | 2250/3330 | 70.6 |
| CS-B7 | 0.400 | 0.050 | 0.550 | 143.30 | 2500 | 4.5E + 12 | 9.91/1.02 | 315 | 2460/1220 | 82.0 |
| CS-B8 | 0.225 | 0.025 | 0.750 | 186.90 | 2860 | 2.0E + 12 | 9.93/0.89 | 356 | 4050/2460 | 77.5 |
| CS-B9 | 0.350 | 0.025 | 0.625 | 200.20 | 3120 | 4.0E + 12 | 9.97/0.82 | 348 | 2260/2020 | 96.5 |

(In the table, Em- and CS- stand for Embodiment and Comparative sample, respectively.)

(Embodiment B10)

Among the composition ratio (mole ratio) of the main constituent powder, SrTiO$_3$—CaTiO$_3$—Bi$_2$O$_3$—TiO$_2$ powder in the embodiment B2, the Bi$_2$O$_3$—TiO$_2$ is varied to 0.025 mole, and La$_2$O$_3$ is added for 0.025 mole, for providing a ceramic capacitor in embodiment B10. The rest remains the same as that for the embodiment B2.

(Embodiment B11)

A ceramic capacitor in embodiment B11 is provided in the same manner as that for the embodiment B10, except that the La$_2$O$_3$ in the embodiment B10 is replaced with Nd$_2$O$_3$ 0.025 mole.

(Embodiment B12)

A ceramic capacitor in embodiment B12 is provided in the same manner as that for the embodiment B10, except that the La$_2$O$_3$ in the embodiment B10 is replaced with CeO$_2$ 0.050 mole.

(Comparative samples B10–B12)

Comparative samples B10–B12 are provided in the same manner as that for the embodiments B10–B12, except that an Ag electrode is printed on both main surfaces of a dielectric ceramic element 1 for 8.0 mm in diameter and baked at 800° C.

These ceramic capacitors in the embodiments B10–B12 undergo the same measurements as in the embodiment B2.

Results of the measurements are shown in Table 3, together with the composition ratio (mole ratio) in the embodiments B10–B12.

(Embodiment C1)

A ceramic capacitor in embodiment C1 is provided as follows: To a 100 part (in weight) of the main constituent powder, SrTiO$_3$—PbTiO$_3$—Bi$_{2/3}$TiO$_3$—CaTiO$_3$ (in mole ratio; SrTiO$_3$ 0.476, PbTiO$_3$ 0.240, Bi$_{2/3}$TiO$_3$ 0.200, CaTiO$_3$ 0.084), an addition agent-cum-sintering auxiliary is added, Nd$_2$O$_3$ for a 1.0 part, ZrO$_2$ for a 0.5 part, SnO$_2$ for a 0.4 part and Cu$_2$O for a 0.2 part, weighed respectively by means of an electronic balance. A dielectric ceramic element 1 is provided in the same way as in the embodiment B$_1$. The dielectric ceramic element 1 thus provided has the dimensions, approximately 10.0 mm in diameter and approximately 1.0 mm in thickness.

A first electrode layer 2 and a second electrode layer 3 are formed in the same manner as that in the embodiment B1, and lead wires are soldered thereon. An epoxy resin is applied to form a molding member.

(Embodiment C2)

A ceramic capacitor in embodiment C2 is provided in the same manner as that for the embodiment C1, except the following: To a 100 part of the main constituent powder, SrTiO$_3$—PbTiO$_3$—Bi$_{2/3}$TiO$_3$ (in mole ratio; SrTiO$_3$ 0.544, PbTiO$_3$ 0.186, Bi$_{2/3}$O$_3$ 0.270), an addition agent-cum-sintering auxiliary is added, MnO$_2$ for a 0.6 part, CeO$_2$ for a 0.2 part.

(Embodiment C3)

A ceramic capacitor in embodiment C3 is provided in the same manner as that for the embodiment C1, except the

TABLE 3

|  | Molar ratio of main constituent | | | | Electrical characteristics | | | | | | |
|---|---|---|---|---|---|---|---|---|---|---|---|
|  | CaTiO$_3$ | Bi$_2$O$_3$—TiO2 | La$_2$O$_3$ | SrTiO$_3$ | Cap (pF) | Q | IR (Ω) 500 Vdc | φ/t (mm/mm) | ε | TC (ppm) −25° C./85° C. | δt(° C.) |
| Em-B10 | 0.250 | 0.025 | 0.025 | 0.650 | 178.00 | 3060 | 3.2E + 12 | 9.93/1.02 | 390 | 2290/2080 | 22.5 |
| Em-B11 | 0.250 | 0.025 | 0.025 | 0.650 | 177.00 | 3100 | 3.1E + 12 | 9.91/1.02 | 390 | 2480/2110 | 24.5 |
| Em-B12 | 0.250 | 0.025 | 0.025 | 0.650 | 180.00 | 3040 | 3.0E + 12 | 9.97/1.02 | 390 | 2410/2100 | 24.0 |
| CS-B10 | 0.250 | 0.025 | 0.025 | 0.650 | 177.20 | 3100 | 3.2E + 12 | 9.93/1.02 | 390 | 2290/2070 | 61.3 |
| CS-B11 | 0.250 | 0.025 | 0.025 | 0.650 | 176.00 | 3200 | 3.1E + 12 | 9.91/1.02 | 390 | 2490/2100 | 65.6 |
| CS-B12 | 0.250 | 0.025 | 0.025 | 0.650 | 178.50 | 3150 | 3.0E + 12 | 9.97/1.02 | 390 | 2400/2120 | 65.7 |

(In the table, Em- and CS- stand for Embodiment and Comparative sample, respectively.)

As Table 3 clearly indicates, it provides the same advantages as those of the embodiments A1–A10 and the embodiment B1–B9, even if at least part of the Bi is replaced with any one or more of La, Ce and Nd.

following: To a 100 part of the main constituent powder, SrTiO$_3$—PbTiO$_3$—Bi$_{2/3}$TiO$_3$ (in mole ratio; SrTiO$_3$ 0.575, PbTiO$_3$ 0.086, Bi$_{2/3}$TiO$_3$ 0.339), and an addition agent-cum-sintering auxiliary is added, MgO for a 1.5 part.

(Embodiment C4)

A ceramic capacitor in embodiment C4 is provided in the same manner as that for the embodiment C1, except the following: To a 100 part of the main constituent powder, $SrTiO_3$—$PbTiO_3$—$Bi_{2/3}TiO_3$—$CaTiO_3$ (in mole ratio; $SrTiO_3$ 0.312, $PbTiO_3$ 0.087, $Bi_{2/3}TiO_3$ 0.362, $CaTiO_3$ 0.239), an addition agent-cum-sintering auxiliary is added, $MnO_2$ for a 0.3 part, $Nd_2O_3$ for a 0.3 part.

(Embodiment C5)

A ceramic capacitor in embodiment C5 is provided in the same manner as that for the embodiment C1, except the following: To a 100 part of the main constituent powder, $SrTiO_3$—$PbTiO_3$—$Bi_{2/3}TiO_3$—$CaTiO_3$ (in mole ratio; $SrTiO_3$ 0.560, $PbTiO_3$ 0.150, $Bi_{2/3}TiO_3$ 0.206, $CaTiO_3$ 0.084), an addition agent-cum-sintering auxiliary is added, $SiO_2$ for a 0.2 part, $Nb_2O_5$ for a 0.2 part.

(Comparative Samples C1–C5)

Comparative samples C1–C5 are provided in the same manner as in the embodiments C1–C5, except that an Ag electrode is printed on both main surfaces of a dielectric ceramic element 1 for 8.0 mm in diameter, and baked at 800° C.

These ceramic capacitors are measured in the same manner as in the embodiment A1. Results of the measurement are shown in Table 4.

Figure 4:
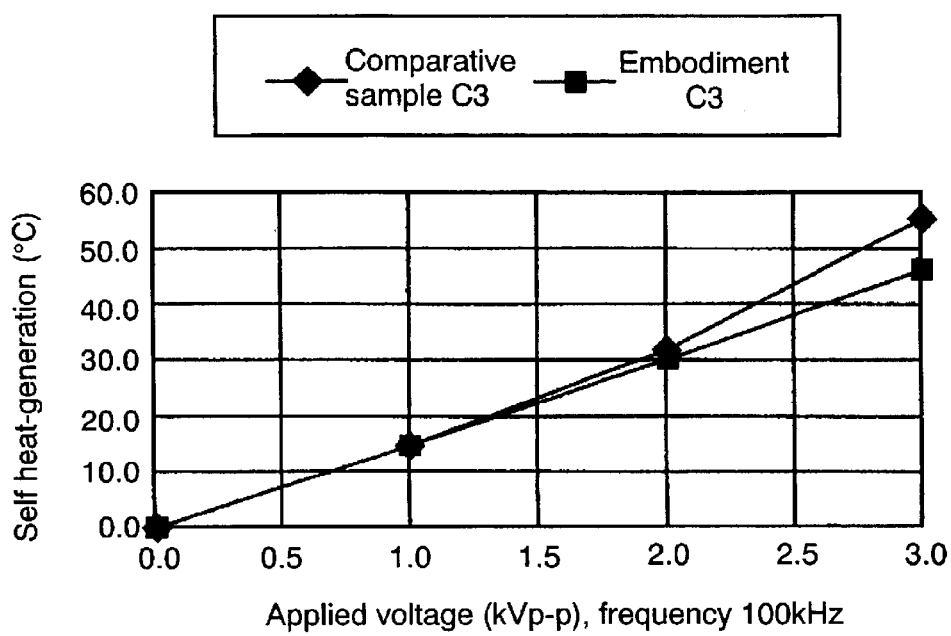
FIG. 4 is a graph showing a relationship between temperature of the self heat-generation and the applied voltage in a still other example of embodiment 1.

As to the embodiment C3 and embodiment C5, the self heat-generation characteristic ($\delta t$) is measured in a voltage range, AC 0 kVp-p-3.0 kVp-p. Results of the embodiment C3 are shown in FIG. 4 in comparison with comparative sample C3; while results of the embodiment C5 in FIG. 5 in comparison with comparative sample C5. The FIG. 4 and FIG. 5 are graphs which exhibit a relationship between the self heat-generation characteristic and the voltage applied thereto.

Figure 5:
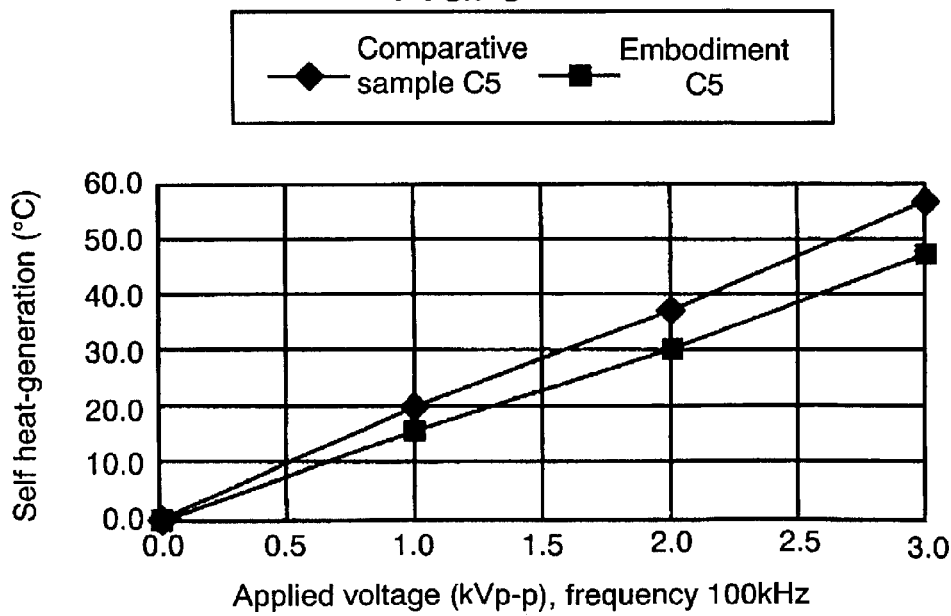
FIG. 5 is a graph showing a relationship between temperature of the self heat-generation and the applied voltage in another ceramic capacitor in accordance with embodiment 1.

As Table 4, FIG. 4 and FIG. 5 clearly indicate, a ceramic capacitor comprising a dielectric ceramic element having a certain specific composition in accordance with the present invention, a first electrode layer made of Zn and a second electrode layer made of Cu is superior to that using an Ag electrode, in terms of the self heat-generation characteristic.

respectively by means of an electronic balance. A dielectric ceramic element 1 is provided by the same way as in the embodiment A1. The dielectric ceramic element 1 thus provided has the dimensions, approximately 10.0 mm in diameter and approximately 1.0 mm in thickness.

A first electrode layer 2 and a second electrode layer 3 are formed in the same way as in the embodiment A1, and lead wires are soldered thereon. An epoxy resin is applied to form a molding member.

(Comparative sample D2)

A comparative sample D2 is provided in the same manner as that for the comparative sample D1, except that an Ag electrode is printed on both main surfaces of a dielectric ceramic element 1 for 8.0 mm in diameter, baked at 800° C.

These are measured with respect to the characteristics items for the ceramic capacitors.

Results of the measurement are as follows:

Comparative sample D1: electrostatic capacitance (Cap) 982.64 (pF), tan $\delta$=1.370 (%), DC resistance (IR)=0.8E+12 ($\Omega$), dielectric shape ($\phi$/t)=8.0/1.35 (mm/mm), dielectric constant ($\in$)=3000.

Comparative sample D2: electrostatic capacitance (Cap)= 980.56 (pF), tan $\delta$=1.363 (%), DC resistance (IR)=0.8E+12 ($\Omega$), dielectric shape ($\phi$/t)=8.0/1.35 (mm/mm), dielectric constant ($\in$)=3000.

Figure 6:
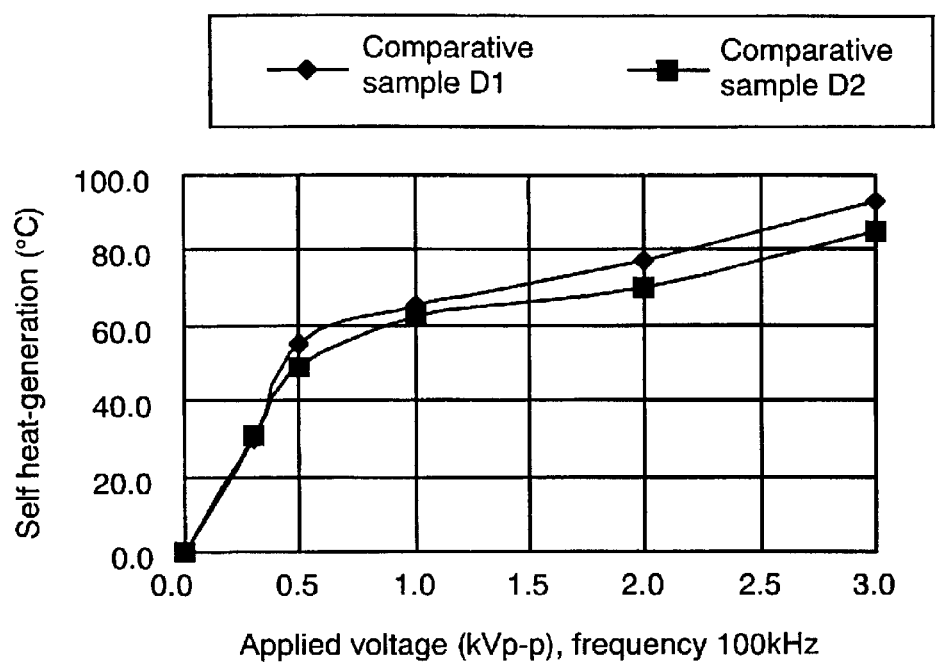
FIG. 6 is a graph showing a relationship between temperature of the self heat-generation and the applied voltage in conventional ceramic capacitor.

The comparative samples D1 and D2 were measured with respect to the self heat-generation characteristic ($\delta t$) in a voltage range, AC 0 kVp-p-3.0 kVp-p. FIG. 6 is the results, showing a relationship between the temperature of self heat-generation and the applied voltage.

As understood from FIG. 6, either the ceramic capacitors comprising a dielectric ceramic element whose composition is different from the compositions of dielectric elements used in the present embodiment, a first electrode layer made of Zn and a second electrode layer made of Cu; or those ceramic capacitors using an Ag electrode are unable to curtail the self heat-generation. The self heat-generation can be suppressed only when a ceramic capacitor is structured based on a combination of a dielectric element formed of any one of the earlier-described compositions (A)–(F) and a first electrode layer 2 that is made of Zn.

TABLE 4

| | Molar ratio of main constituent | | | | Electrical characteristics | | | | | | |
|---|---|---|---|---|---|---|---|---|---|---|---|
| | | | | | Cap | Tan $\delta$ | IR ($\Omega$) | $\phi$/t | | TC (%) | |
| | $SrTiO_3$ | $PbTiO_3$ | $Bi_{2/3} TiO_3$ | $CaTiO_3$ | (pF) | (%) | 500 Vdc | (mm/mm) | $\epsilon$ | −25° C./85° C. | $\delta t$(° C.) |
| Em-C1 | 0.476 | 0.240 | 0.200 | 0.084 | 1289.0 | 0.260 | 3.5E + 11 | 8.54/1.03 | 2840 | 2.4/−9.2 | 85.5 |
| Em-C2 | 0.544 | 0.186 | 0.270 | 0.000 | 1168.0 | 0.510 | 4.0E + 11 | 8.46/0.97 | 2430 | −2.6/−9.6 | 98.6 |
| Em-C3 | 0.575 | 0.086 | 0.339 | 0.000 | 896.0 | 0.080 | 5.0E + 12 | 8.44/1.01 | 1940 | 8.0/−14.4 | 44.2 |
| Em-C4 | 0.312 | 0.087 | 0.362 | 0.239 | 328.0 | 0.560 | 7.0E + 12 | 8.48/1.01 | 710 | −0.7/−3.6 | 66.6 |
| Em-C5 | 0.560 | 0.150 | 0.206 | 0.084 | 1366.0 | 0.230 | 7.0E + 11 | 8.34/1.04 | 3040 | 11.3/28.4 | 45.8 |
| CS-C1 | 0.476 | 0.240 | 0.200 | 0.084 | 1291.0 | 0.230 | 3.1E + 11 | 8.59/1.03 | 2790 | 2.8/−9.8 | 91.5 |
| CS-C2 | 0.544 | 0.186 | 0.270 | 0.000 | 1086.0 | 0.500 | 3.4E + 11 | 8.49/0.94 | 2190 | −2.0/−10.0 | 112.5 |
| CS-C3 | 0.575 | 0.086 | 0.339 | 0.000 | 873.0 | 0.080 | 5.0E + 12 | 8.44/1.02 | 1910 | 8.2/14.4 | 54.1 |
| CS-C4 | 0.312 | 0.087 | 0.362 | 0.239 | 319.0 | 0.540 | 6.0E + 12 | 8.46/1.01 | 690 | −0.7/−3.7 | 69.6 |
| CS-C5 | 0.560 | 0.150 | 0.206 | 0.084 | 1364.0 | 0.230 | 7.0E + 11 | 8.31/1.05 | 3070 | 11.5/28.3 | 56.7 |

(In the table, Em- and CS- stand for Embodiment and Comparative sample, respectively.)

(Comparative sample D1)

Comparative sample D1 is provided as follows: To a 100 part (in weight) of $BaTiO_3$ powder, an addition agent-cum-sintering auxiliary is added, $Bi_2O_3$ for a 3 part, $SnO_2$ for a 2 part, $Al_2O_3$ for a 1 part, $La_2O_3$ for a 1 part, $ZrO_2$ for a 1 part, $SiO_2$ for a 0.5 part, $MnO_2$ for a 0.2 part, weighed (Embodiment 2)

Figure 7:
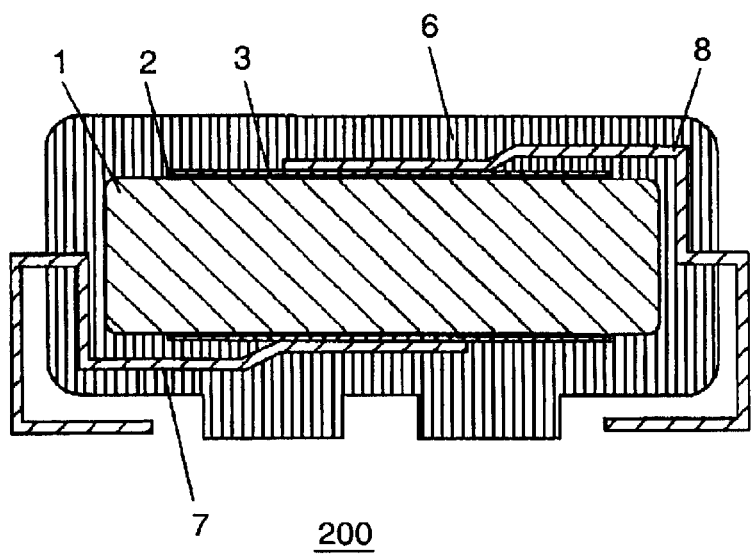
FIG. 7 is a cross sectional view of a mold type ceramic capacitor in accordance with a second exemplary embodiment of the present invention.

FIG. 7 is a cross sectional view showing a molded type ceramic capacitor in accordance with a second exemplary embodiment of the present invention. Those parts having identical functions as those described in the embodiment 1 are represented by using same symbols.

As shown in FIG. 7, a molded type ceramic capacitor 200 comprises a disc shape dielectric ceramic element 1 provided on the both main surfaces with a first electrode layer 2 and a second electrode layer 3. A couple of lead terminals 7 and 8 is soldered on the second electrode layer 3.

A molding member 6 entirely covers the dielectric ceramic element 1, the first electrode layer 2 and the second electrode layer 3, as well as part of the lead terminals 7, 8.

The portion of lead terminals 7, 8 pushing out of the molding member 6 forms external terminals. A ceramic capacitor is mounted on the surface of a circuit board via these external terminals.

The dielectric ceramic element 1, the first electrode layer 2, the second electrode layer 3 and the molding member 6 in the present embodiment 2 are made, respectively, of the same materials as those used in the embodiment 1.

The lead terminals 7, 8 may be made of any conductive materials. However, any one of metal materials Fe, Cu and Ni is preferred in view of the electrical characteristic and the machining property.

(Embodiment 3)

Figure 8:
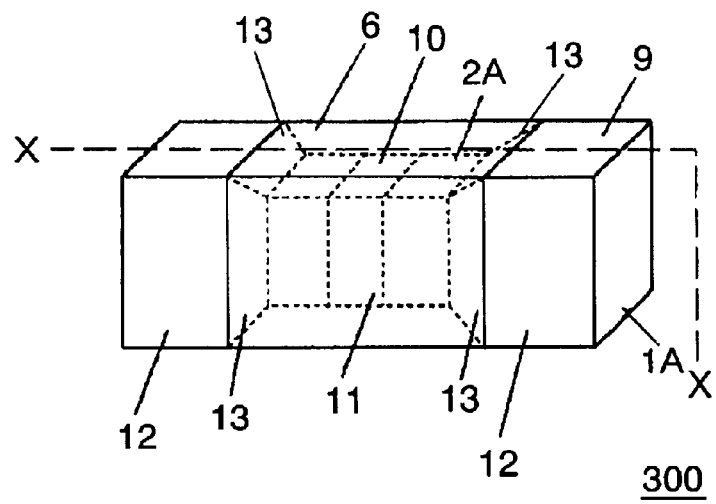
FIG. 8 is a perspective view of a chip type ceramic capacitor in accordance with a third exemplary embodiment of the present invention.
Figure 9:
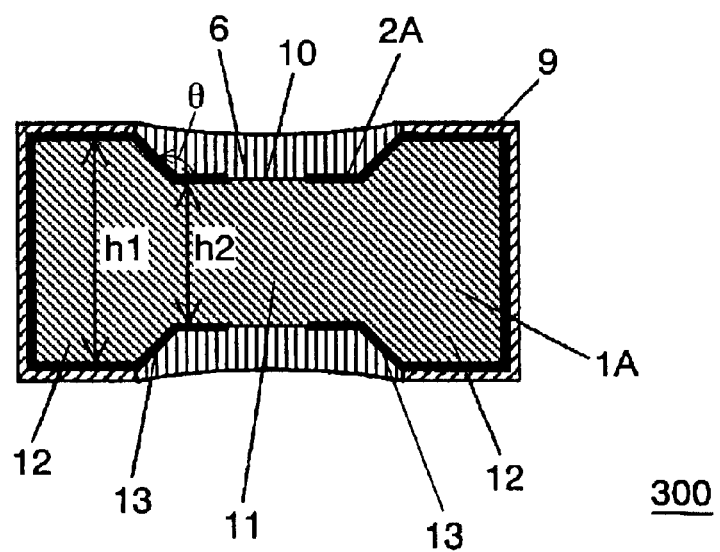
FIG. 9 is a cross sectional view of the chip type ceramic capacitor in embodiment 3.

FIG. 8 and FIG. 9 show a see-through perspective view and a cross sectional view, respectively, of a chip type ceramic capacitor in accordance with a third exemplary embodiment of the present invention. FIG. 9 shows the view sectioned along the line X—X of FIG. 8. Those constituent parts identical to those described in the embodiments 1, 2 are represented by using the same symbols.

Referring to FIG. 8 and FIG. 9, terminal sections 12 of a chip type ceramic capacitor 300 are covered by terminal electrodes 9, and the space in between the terminal electrodes is filled with a molding member 6. The chip type ceramic capacitor 300 has a substantially rectangular parallelepiped appearance.

A body 1A made of dielectric ceramic is provided at both ends with terminal sections 12, and a core section 11 in the middle. The surface of core section 11 is sinking for the entire outer circumference from the level of terminal sections 12. The sinking part is filled with the molding member 6.

Dimensional proportion between the height h1 at the terminal sections 12 and the height h2 at the core section 11 should preferably be h2/h1=0.5–0.85, in order for a body 1A to be able to maintain a minimum physical strength. Namely, a ratio between h1 and h2 is preferred to be falling within a range; h1:h2=1:0.5–0.85. If it is less than 0.5, a ceramic capacitor may fall short of the physical strength, rendering it difficult for a ceramic capacitor to maintain an essential quality level. On the other hand, if the value is in excess of 0.85, it leads to a too-thin molding member 6, which endangers a moisture-proof property and the overall reliability.

It is further preferred to provided a slope section 13 in the regions between the core section 11 and the terminal sections 12. The slope section 13 contributes to dispose a molding member 6 in a reliable and stable manner. Namely, in a case where a slope section 13 is provided, air bubbles will hardly arise between the molding member 6 and the body 1A. An angle θ formed by the core section 11 and the slope section 13 should preferably be falling within a range, 90 degrees–150 degrees. If the angle is less than 90 degrees, the air bubbles readily appear, making it difficult to dispose a molding member 6 in a stable state. If it is in excess of 150 degrees, the molding member 6 becomes too thin, which invites a deterioration in the moisture-proof property as well as the overall reliability.

On the surface of the body 1A having the above-described structure, a conductive layer 2A is formed, which layer 2A is separated by a gap 10 at the core section 11. The conductive layer 2A corresponds to the first electrode layer 2 of embodiment 1. The molding member 6 is covering the gap 10, the core section 11 and the conductive layer 2A formed on the slope section 13.

The surface of conductive layer 2A at the terminal sections 12 not covered by the molding member 6 is covered by a terminal electrode 9. Instead of providing the terminal electrode 9, the conductive layer 2A exposed at terminal sections 12 may be used as it is for an electrode.

Surfaces of the molding member 6 and the terminal sections 12 are substantially on a single plane, and the chip capacitor has an overall appearance of approximately rectangular parallelepiped form. This form is advantageous in mounting a chip capacitor on a circuit board. Although it is an advantage for a chip type ceramic capacitor 300 to have a rectangular parallelepiped form, it may take instead a round column shape or a polygonal shape, in so far as the advantage at the mounting operation is not impaired.

Next, the structures in a chip type ceramic capacitor 300 will be described in detail.

Any one of the earlier-described dielectric ceramic compositions (A)–(F) is used as the main constituent for the body 1A, as described in the embodiments 1 and 2. The conductive layer 2A is made of a material consisting mainly of Zn. The molding member 6 is also identical to that described in the embodiments 1 and 2.

The terminal electrode 9 contributes to improving the solderability at mounting, and protecting the conductive layer 2A. The terminal electrode 9 is made of any one or more selected from Ni, Sn and a solder. Among them, an electrode of Sn or a solder formed on a Ni layer is especially preferred because of the superior solderability and heat-resistive property.

Between the conductive layer 2A and the terminal electrode 9, any one or more selected from Cu, Ni, Ag, Pd and Al may be provided for the second electrode layer which was described in the embodiments 1 and 2.

Now, a method for manufacturing a chip type ceramic capacitor in accordance with a third embodiment of the present invention is described.

In the same manner as in the embodiments 1, 2, one of the dielectric ceramic compositions (A) through (F) is added with a certain specific addition agent-cum-sintering auxiliary, wet-mixed or granulated by a generally practiced kiln procedure, compression-formed using a die, and then sintered.

The sintered body 1A of an approximate rectangular parallelepiped form is ground off in the middle part around the outer circumference to provide a core section 11, which is sinking from the surface of terminal sections 12 at both ends. Instead of applying the post grinding on the surface of sintered body 1A, the die for compression-forming may be designed for providing the core section. Then the post grinding process on body 1A can be eliminated.

Next, a photosensitive resin is applied on the body 1A in a certain specific region corresponding to the gap 10 between conductive layers 2A. The photosensitive resin is exposed and developed to form a mask covering around the outer circumference of body 1A.

A conductive layer 2A made mainly of Zn is formed on the entire surface of body 1A, excluding the masked region. Practical method of forming the layer includes a so-called dip coating process where it is immersed in a Zn paste, a printing method, an electrodeposition, a plating method, a vacuum deposition, etc.

Then, the photosensitive resin masking the region corresponding to the gap 10 is removed. Thus, the conductive layers 2A separated to each other by the gap 10 are provided formed in a certain specific pattern.

Besides the above-described procedure, the conductive layers 2A separated by gap 10 can be formed by a direct coating process, where the respective conductive layers 2A are coated direct on the body 1A excluding a region in which no conductive layer 2A is formed. Or, by removing a conductive layer 2A, which is once formed by various layer forming processes covering the entire surface of body 1A, in a region corresponding to the gap 10. The process for removing the conductive layer can be grinding, laser-trimming, physical or chemical etching, etc. The laser-trimming, among others, is preferred because of the high processing precision.

When removing the unnecessary portion of conductive layer 2A by a laser-trimming process, the portion of a conductive layer 2A is first removed with a laser beam for a certain specific thickness of the conductive layer 2A, and then etching is applied to the whole part. The latter etching is conducted until the unnecessary portion of conductive layer 2A is completely etched off. Thereby, a conductive layer 2A other than the unnecessary portion stays, and the conductive layers 2A trimmed in a certain specific pattern are provided. In the presently described process of laser-trimming, the heat generated while removing the conductive layer 2A formed on the surface of body 1A does not reach the body 1A. Therefore, there will be least degeneration due to heat in the materials of body 1A, least deterioration in the characteristics of body 1A.

An insulting material is applied to cover the conductive layers 2A disposed on the core section 11, to complete a molding member 6.

A terminal electrode 9 is provided covering the conductive layer 2A at the terminal sections 12. In this way, a chip type ceramic capacitor 300 in embodiment 3, which has a rectangular parallelepiped form that is advantageous in the mounting operation, is provided.

Figure 10:
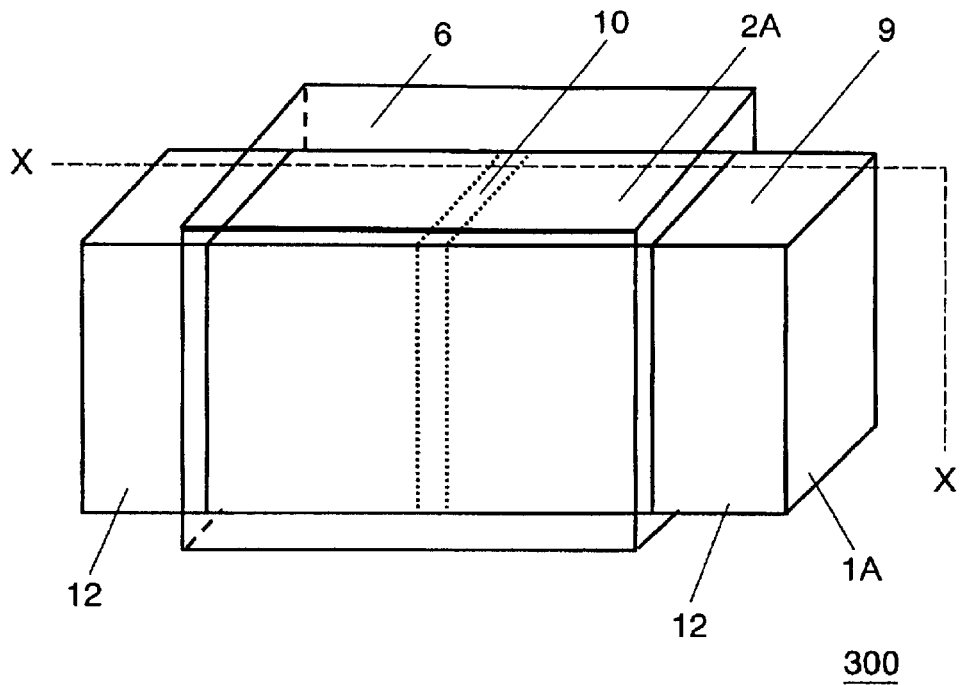
FIG. 10 is a perspective view showing another example of a ceramic capacitor in embodiment 3.
Figure 11:
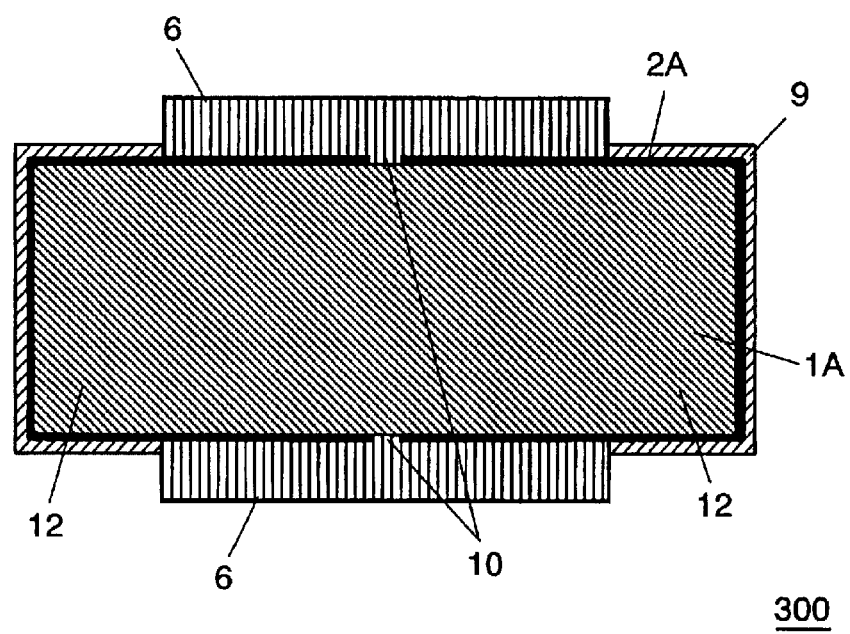
FIG. 11 is a cross sectional view showing the ceramic capacitor in embodiment 3.

In a case where the advantage in mounting operation and the filled-in configuration of molding member 6 are not essential, formation of the core section 11, which is sinking from the terminal sections 12, can be eliminated. Namely, the body 1A can take a simple rectangular parallelepiped form, a square pillar or a round column form, and the conductive layers 2A may be provided thereon with a gap 10. As an example of such structure, FIG. 10 shows a perspective view of a ceramic capacitor using a body 1A of substantially rectangular parallelepiped shape, while FIG. 11 shows the cross sectional view sectioned along the X—X line of FIG. 10. Those constituent parts identical to those in FIG. 8 and FIG. 9 are represented by using the same symbols.

(Embodiment 4)

Figure 12:
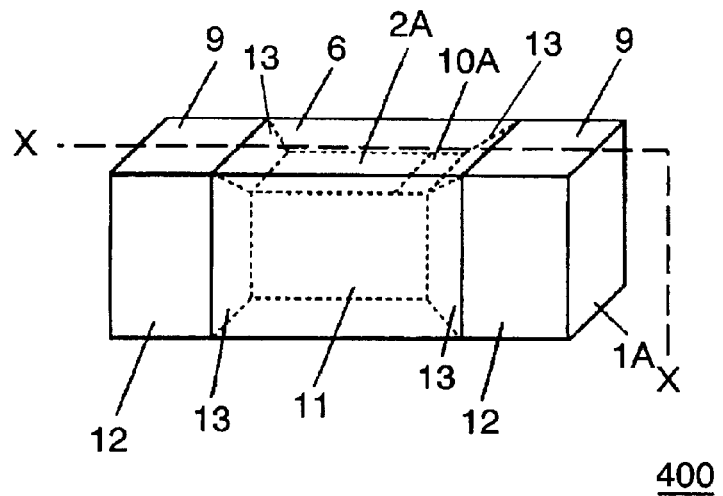
FIG. 12 is a perspective view of a chip type ceramic capacitor in accordance with a fourth exemplary embodiment of the present invention.
Figure 13:
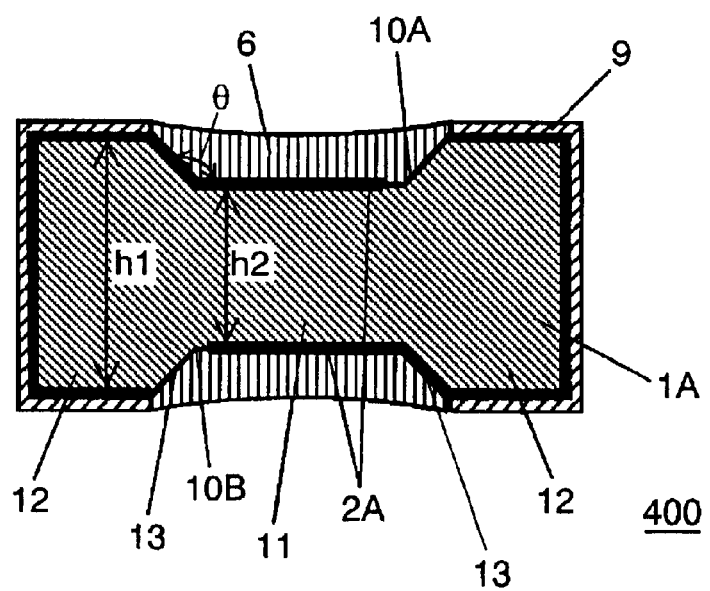
FIG. 13 is a cross sectional view of the chip type ceramic capacitor in embodiment 4.

FIG. 12 and FIG. 13 show a see-through perspective view and a cross sectional view, respectively, of a chip type ceramic capacitor in accordance with a fourth exemplary embodiment of the present invention. FIG. 13 shows the view sectioned along the line X—X of FIG. 12. Those constituent parts identical to those described in the embodiment 3 are represented by using the same symbols.

As seen in FIG. 12 and FIG. 13, present embodiment 4 is different from the embodiment 3 in the gap 10 separating the conductive layers 2A. The conductive layers 2A in embodiment 4 are stretching to different directions to each other on the surfaces of a couple of opposing faces of body 1A in the core section 11, and the conductive layers 2A are separated to each other by a gap 10A and a gap 10B. The conductive layers 2A stretching in the opposite directions cover the respective terminal sections 12. The other couple of opposing faces of the core section 11 has no conductive layer 2A. Thus the conductive layers 2 are provided, respectively, on the top and the bottom surfaces of body 1A in a region between the terminal sections 12. The gap 10A and the gap 10B separating the conductive layers 2A are disposed point symmetrically to each other. The conductive layers 2A may be provided only on the side surfaces of the terminal sections 12, those on the end faces are not essential.

A chip type ceramic capacitor 400 in embodiment 4 is provided with electrostatic capacitance between the terminal sections 12 at the gap 10A and the gap 10B, which separate the conductive layers 2A. Furthermore, the electrostatic capacitance is provided by the thickness (height h2) of body 1A at the core section 11, which core section 11 having the conductive layers 2A formed on both surfaces of the couple of faces. A certain specific electrostatic capacitance may be provided by controlling thickness of body 1A at the core section 11.

The rest of the structure and the manufacturing method remains the same as that in the embodiment 3; so, description on which is omitted here.

In a case where the advantage in mounting operation and the filled-in configuration of molding member 6 are not essential in the present embodiment 4, formation of the core section 11, which is sinking from the terminal sections 12, can be eliminated. Namely, the body 1A can take a simple rectangular parallelepiped form, and the respective conductive layers 2A may be provided stretching on the opposing surfaces of a couple of faces of the body 1A, with the gap 10A and the gap 10B disposed between the conductive layers.

(Embodiment 5)

Figure 14:
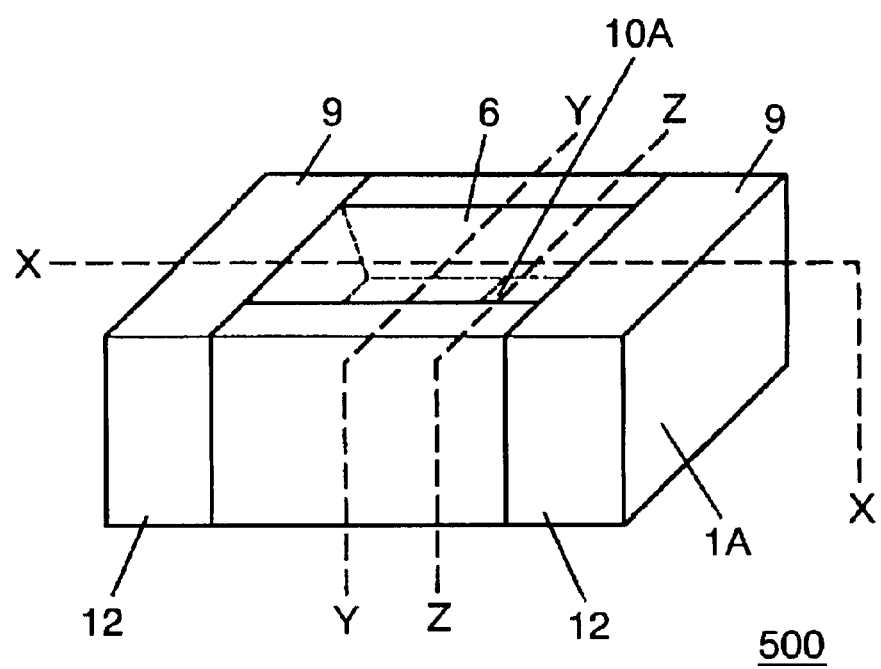
FIG. 14 is a perspective view of a chip type ceramic capacitor in accordance with a fifth exemplary embodiment of the present invention.
Figure 15A:
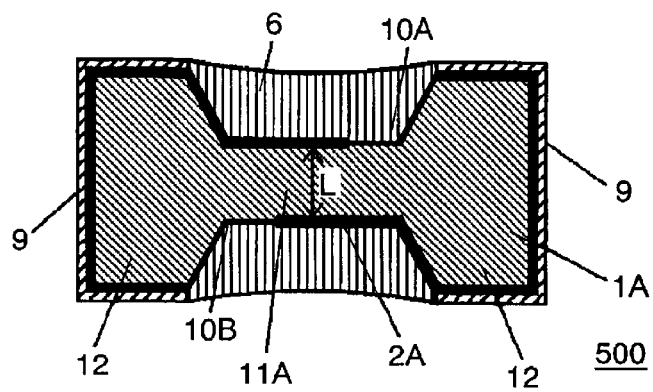
FIG. 15A is a cross sectional view of the chip type ceramic capacitor in embodiment 5.

FIG. 14 is a perspective view of a chip type ceramic capacitor in accordance with a fifth exemplary embodiment of the present invention. FIG. 15A shows the cross sectional view sectioned along the line X—X of FIG. 14, FIG. 15B the cross sectional view sectioned along the line Y—Y of FIG. 14, and FIG. 15C the cross sectional view sectioned along the line Z—Z of FIG. 14. Those constituent parts identical to those described in the embodiment 4 are represented by using the same symbols. The respective constituent parts of a chip type ceramic capacitor 500 in the present embodiment 5 are identical to those in the embodiment 4; so, detailed description on which is partly omitted.

As illustrated in FIG. 14, a chip type ceramic capacitor 500 comprises a body 1A which is provided at both ends with a terminal section 12, and a hollow between the terminal sections 12 is filled with a molding member 6. The overall shape exhibits a substantially rectangular parallelepiped appearance.

As shown in FIG. 15A, the rectangular parallelepiped body 1A of chip type ceramic capacitor 500 is provided in each of the surfaces of a couple of opposing faces with a hollow. Depth of the opposing hollows is optional; thickness L of body 1A at the middle opposing part 11A is determined by the depth of the opposing hollows. The opposing hollows should preferably be symmetrical to each other with respect to the middle opposing part 11A and have the same volume. However, the hollows may be different ones.

Figure 15B:
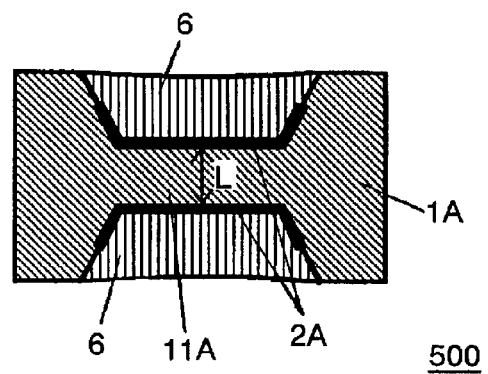
FIG. 15B is another cross sectional view of the chip type ceramic capacitor in embodiment 5.
Figure 15C:
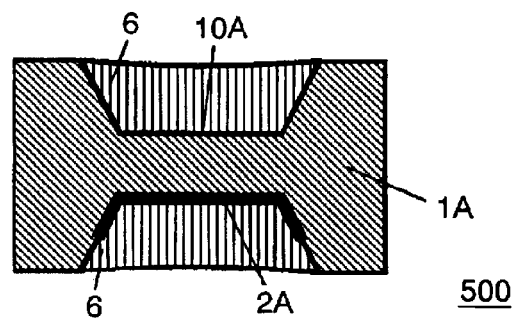
FIG. 15C is a still other cross sectional view of the chip type ceramic capacitor in embodiment 5.

As shown in FIGS. 15A–15C, conductive layers 2A are stretching on the surfaces of body 1A in the opposing hollow. Namely, the conductive layers 2A are disposed respectively on the top surface and the bottom surface of the middle opposing part 11A of body 1A. Furthermore, the conductive layers 2A are separated from each other by a gap 10A and a gap 10B on the top surface and the bottom surface.

The conductive layers 2A stretching on different surfaces cover the respective terminal sections 12 of body 1A. The gap 10A and the gap 10B are disposed point symmetrically between the terminal sections 12.

The opposing hollows are filled with a molding member 6 covering the conductive layer 2A, the gaps 10A, 10B.

A terminal electrode 9 is provided covering the conductive layer 2A. Instead of providing the terminal electrode 9, the conductive layer 2A exposed at terminal sections 12 may be used as it is for an electrode.

Surfaces of the molding member 6 and the terminal sections 12 are substantially on a single plane, and the chip capacitor has an overall appearance of approximately rectangular parallelepiped form. This form is advantageous in mounting a chip capacitor on a circuit board.

A chip type ceramic capacitor 500 in embodiment 5 is provided with electrostatic capacitance between the terminal sections 12 at the gap 10A and the gap 10B, which separate the conductive layers 2A. Furthermore, the electrostatic capacitance is provided by the thickness L of middle opposing section 11A, which middle opposing section 11A having the conductive layers 2A formed on the both surfaces. A certain specific electrostatic capacitance may be provided by controlling the thickness L.

A point of special importance with a chip type ceramic capacitor 500 in the present embodiment is that even when the thickness L is made smaller for providing a larger electrostatic capacitance, physical strength of the capacitor is maintained by the portion of the body 1A surrounding the middle opposing section 11A.

In the same manner as in the embodiments 1 through 4, the body 1A is made by using any one of the earlier-described dielectric ceramic compositions (A)–(F), as the main constituent. The conductive layer 2A is made mainly of Zn. The molding member 6 is also identical to the one described in the embodiments 1 through 4. The terminal electrode 9 is also identical to the one describe in the embodiments 3 and 4.

Now, a method for manufacturing a chip type ceramic capacitor 500 is described.

A body 1A is provided in the same manner as in the embodiments 3, 4; so, the description is omitted here.

A conductive layer 2A is formed on both surfaces of the body 1A. The conductive layers 2A are provided so that there is a gap 10A at one hollow, and a gap 10B at the other hollow.

Method of conductive layer 2A formation remains the same as that described in the embodiment 4.

The hollow is filled with a molding member 6 made of the above-described insulating material. The outer surface of molding member 6 and that of the terminal sections 12 should preferably share a same plane in view of good mountability on a circuit board.

A terminal electrode 9 is provided to cover the conductive layer 2A at terminal sections 12.

A chip type ceramic capacitor 500 thus provided in accordance with embodiment 5 takes a rectangular parallelepiped appearance. This shape is advantageous in the mounting operation.

As described in the above exemplary embodiments 1 through 5, a ceramic capacitor in the present invention may be embodied in a number of different configurations. However, regardless of the configuration of embodiment, a ceramic capacitor in the present invention, which comprises a dielectric ceramic element provided by using any one of the dielectric ceramic compositions (A)–(F) as the main constituent and an electrode made mainly of Zn disposed on the opposing surfaces of the dielectric ceramic element, exhibits a suppressed self heat-generation even in the high frequency, high voltage operating conditions.

What is claimed is:

1. A ceramic capacitor comprising:
    a dielectric ceramic element assembly having two surfaces and comprising a material selected from the group consisting of:
        a dielectric composition of $CaTiO_3$—$La_2O_3$—$TiO_2$,
        a dielectric composition of $SrTiO_3$—$CaTiO_3$—$Bi_2O_3$—$TiO_2$,
        a dielectric composition of $SrTiO_3$—$PbTiO_3$—$Bi_2/3TiO_3$, and
        a dielectric composition of $SrTiO_3$—$PbTiO_3$—$Bi_2/3TiO_3$—$CaTiO_3$; and
    first electrode layers comprising mainly Zn, one of said layers being located on each of said surfaces.

2. The ceramic capacitor of claim 1, further comprising a second electrode layer mainly comprising at least one material selected from the group consisting of Cu, Ni, Ag, Pd, and Al located on a surface of said first electrode layer.

3. The ceramic capacitor of claim 2, further comprising:
    a lead wire connected to said second electrode layer; and
    a molding member covering said dielectric ceramic element assembly, said first electrode layer, said second electrode layer and part of said lead wire.

4. The ceramic capacitor of claim 3, further comprising an external terminal formation section, wherein a portion of said lead wire extending out from a side of said molding member is attached to the external terminal formation section.

5. The ceramic capacitor of claim 1, further comprising first and second terminal sections each at different ends of said dielectric ceramic element assembly, wherein said first electrode layer is located on said first and second terminal sections, and said first electrode layer on said first terminal section is separated by a gap from said first electrode layer on said second terminal section at least in a location between said terminal sections, said gap being an absence of said first electrode layer on said hollow portions.

6. The ceramic capacitor of claim 5, wherein said dielectric ceramic element assembly further comprises a core section having an outer circumference smaller than an outer circumference of said terminal sections.

7. The ceramic capacitor of claim 6, wherein said gap is at least at a location on said core section.

8. The ceramic capacitor of claim 6, wherein said core section comprises at least a couple of opposing surfaces, and said first electrode layer is located on at least said couple of surfaces and said terminal sections.

9. The ceramic capacitor of claim 6, wherein said dielectric ceramic element assembly comprises a sloped surface between said core section and each of said terminal sections.

10. The ceramic capacitor of claim 9, wherein an angle between said sloped surface and said core section is from 90 degrees to 150 degrees.

11. The ceramic capacitor of claim 7, wherein a ratio between a height of said terminal sections and a height of said core section is 1:0.5–0.85.

12. The ceramic capacitor of claim 5, further comprising a molding member located between said terminal sections covering said core section.

13. The ceramic capacitor of claim 12, wherein said molding member comprises an outer surface, which is substantially on a same plane as said terminal sections.

14. The ceramic capacitor of claim 5, further comprising a terminal electrode located on the surface of said first layer at said terminal sections.

15. The ceramic capacitor of claim 5, wherein said dielectric ceramic element assembly comprises a substantially rectangular parallelepiped form having a two opposing surfaces, and
  said first electrode layer is located on at least one of said two surfaces and said terminal sections.

16. The ceramic capacitor of claim 13, wherein said dielectric ceramic element assembly comprises a substantially rectangular parallelepiped body having two opposing surfaces and a hollow portion in each of said opposing surfaces, wherein
  said first electrode layer is located on at least a surface of one of said hollow portions, and extends along a surface of said hollow portion so that one of said first electrode layers is connected to said first terminal section and separated by a gap from said second terminal section, which is connected to the other of said first electrode layers.

17. The ceramic capacitor of claim 1, wherein said first electrode layer comprises a conductive layer located on the surface of said dielectric ceramic element assembly.

18. A ceramic capacitor comprising:
  a dielectric ceramic element assembly having two surfaces and comprising a material selected from the group consisting of:
    a dielectric composition of $CaTiO_3$—$La_2O_3$—$TiO_2$—$SrTiO_3$, and
    a dielectric composition of $SrTiO_3$—$CaTiO_3$;
  first electrode layers comprising mainly Zn, one of said layers being located on each of said surfaces;
  a second electrode layer mainly comprising at least one material selected from the group consisting of Cu, Ni, Ag, Pd, and Al located on a surface of said first electrode layer;
  a lead wire connected to said second electrode layer; and
  a molding member covering said dielectric ceramic element assembly, said first electrode layer, said second electrode layer and part of said lead wire.

19. The ceramic capacitor of claim 18, further comprising an external terminal formation section, wherein a portion of said lead wire extending out from a side of said molding member is attached to the external terminal formation section.

20. A ceramic capacitor comprising:
  a dielectric ceramic element assembly having two surfaces and comprising a material selected from the group consisting of:
    a dielectric composition of $CaTiO_3$—$La_2O_3$—$TiO_2$—$SrTiO_3$, and
    a dielectric composition of $SrTiO_3$—$CaTiO_3$;
  first electrode layers comprising mainly Zn, one of said layers being located on each of said surfaces;
  first and second terminal sections each at different ends of said dielectric ceramic element assembly, wherein said first electrode layer is located on said first and second terminal sections, and said first electrode layer on said first terminal section is separated by a gap from said first electrode layer on said second terminal section at least in a location between said terminal sections, said gap being an absence of said first electrode layer, wherein
    said dielectric ceramic element assembly further comprises a core section having an outer circumference smaller than an outer circumference of said terminal sections.

21. The ceramic capacitor of claim 20, wherein said gap is at least at a location on said core section.

22. The ceramic capacitor of claim 21, wherein a ratio between a height of said terminal sections and a height of said core section is 1:0.5–0.85.

23. The ceramic capacitor of claim 20, wherein said core section comprises at least a couple of opposing surfaces, and said first electrode layer is located on at least said couple of surfaces and said terminal sections.

24. The ceramic capacitor of claim 20, wherein said dielectric ceramic element assembly comprises a sloped surface between said core section and each of said terminal sections.

25. The ceramic capacitor of claim 24, wherein an angle between said sloped surface and said core section is from 90 degrees to 150 degrees.

26. A ceramic capacitor comprising:
  a dielectric ceramic element assembly having two surfaces and comprising a material selected from the group consisting of:
    a dielectric composition of $CaTiO_3$—$La_2O_3$—$TiO_2$—$SrTiO_3$, and
    a dielectric composition of $SrTiO_3$—$CaTiO_3$;
  first electrode layers comprising mainly Zn, one of said layers being located on each of said surfaces;
  first and second terminal sections each at different ends of said dielectric ceramic element assembly, wherein said first electrode layer is located on said first and second terminal sections, and said first electrode layer on said first terminal section is separated by a gap from said first electrode, layer on said second terminal section at least in a location between said terminal sections, said gap being an absence of said first electrode layer; and
  a molding member located between said terminal sections and covering said core section.

27. The ceramic capacitor of claim 26, wherein said molding member comprises an outer surface, which is substantially on a same plane as said terminal sections.

28. The ceramic capacitor of claim 27, wherein said dielectric ceramic element assembly comprises a substantially rectangular parallelepiped body having two opposing surfaces and a hollow portion in each of said opposing surfaces, wherein
  said first electrode layer is located on at least a surface of one of said hollow portions, and extends along a surface of said hollow portion so that one of said first electrode layers is connected to said first terminal section and separated by a gap from said second terminal section, which is connected to the other of said first electrode layers.

29. A ceramic capacitor comprising:
  a dielectric ceramic element assembly having two surfaces and comprising a material selected from the group consisting of:
    a dielectric composition of $CaTiO_3$—$La_2O_3$—$TiO_2$—$SrTiO_3$, and
    a dielectric composition of $SrTiO_3$—$CaTiO_3$;
  first electrode layers comprising mainly Zn, one of said layers being located on each of said surfaces;
  first and second terminal sections each at different ends of said dielectric ceramic element assembly, wherein said first electrode layer is located on said first and second terminal sections, and said first electrode layer on said first terminal section is separated by a gap from said first electrode layer on said second terminal section at least in a location between said terminal sections, said gap being an absence of said first electrode layer, wherein
    said dielectric ceramic element assembly comprises a substantially rectangular parallelepiped form having two opposing surfaces, and
    said first electrode layer is located on at least one of said two surfaces and said terminal sections.

* * * * *